United States Patent [19]

Suga

[11] Patent Number: 4,468,796
[45] Date of Patent: Aug. 28, 1984

[54] FREQUENCY RELAY FOR USE IN THE PROTECTION OF ELECTRIC POWER TRANSMISSION LINES

[75] Inventor: Noriyoshi Suga, Fuchu, Japan

[73] Assignee: Tokyo Shibaura Denki Kabushiki Kaisha, Kawasaki, Japan

[21] Appl. No.: 258,926

[22] Filed: Apr. 30, 1981

[30] Foreign Application Priority Data

Apr. 30, 1980 [JP] Japan ................................. 55-57556

[51] Int. Cl.³ .......................................... G01R 31/08
[52] U.S. Cl. ...................................... 377/28; 377/39; 377/43; 324/78 D; 324/83 R
[58] Field of Search ............ 361/86, 42; 307/73, 307/129, 130; 324/78 R, 83 R, 140 R, 78 Z; 340/658, 661; 364/484; 377/28, 39, 43

[56] References Cited

U.S. PATENT DOCUMENTS 3,895,293  7/1975  Munz ................................. 324/78 Z
4,050,747  9/1977  Ruhnau et al. ....................... 303/95

Primary Examiner—Joseph A. Orsino, Jr.
Assistant Examiner—Timothy K. Greer
Attorney, Agent, or Firm—Oblon, Fisher, Spivak, McClelland & Maier

[57] ABSTRACT

A digital frequency relay for use in protecting an electrical power transmission line in the event of frequency deviations indicative of a fault condition, including an input device for receiving AC electric signals, and an oscillator for generating a reference frequency, which are connected to respective first and second counters which respectively count the number of output pulses from the oscillator during the AC electric signal positive half-cycle, and during the AC electric signal negative half-cycle. The resultant output from the first and second counters is added and compared with a set value to produce a trip signal for the frequency relay.

7 Claims, 6 Drawing Figures

FREQUENCY RELAY FOR USE IN THE PROTECTION OF ELECTRIC POWER TRANSMISSION LINES

BACKGROUND OF THE INVENTION

1. Field of the Invention

This invention generally relates to a digital type frequency relay for use in the protection of electric power transmission lines.

2. Description of the Prior Art

The frequency of an electric power transmission line is always maintained at a constant frequency. But in case the relationship between the quantity of generated electric power and the quantity of consumed electric power in the electric power transmission line is fairly unbalanced by a fault of the transmission line, the frequency can rise or fall accordingly.

If the frequency varies above or below a predetermined frequency, it is necessary to detect the fault by a frequency relay, and to carry out suitable controls, for example separating the transmission line with a fault from the normal transmission line, limiting the generated electric power, or limiting the consumed electric power.

A known digital type frequency relay is constituted to measure the period of the transmission line voltage in comparison with a steady high frequency signal generated by a crystal oscillator, etc., as a reference, whereby the actual frequency is detected by converting the decreasing or increasing period into a rising or falling frequency.

FIG. 1 shows a block diagram illustrating one example of a conventional digital type frequency relay. PT represents an auxiliary potential transformer which converts the line voltage to a suitable voltage level to be able to match the relay. BF represents a rectangular wave converting circuit which converts the sine wave from the potential transformer PT to the rectangular wave. DIV represents a divider circuit which divide the rectangular wave from the converting circuit to the period of $\frac{1}{2} \cdot m (m=1, 2, 3 \ldots)$. The reason to provide this divider circuit is to accurately measure the period even when the input sine wave is biased to either a positive sign or a negative sign.

OSC represents an oscillator which oscillates at a reference frequency $f_{OSC}$ to measure the output period from the divider circuit DIV. AND represents a logical product circuit which receives the outputs of the divider circuit DIV and the oscillator OSC.

C represents a pulse counter which counts the number of pulses from the logical product circuit AND and has a reset terminal to clear the state of the counter C. SET represents a setter which sets a setting value. COM represents a comparator which compares the output of the pulse counter C with the setting value of setter SET.

TI represents a discriminator which judges the output of the discriminator TI on receiving a judging pulse explained hereinafter.

CC represents a controlling circuit which generates a clear pulse (CP) to be transmitted to the pulse counter C and a judging pulse JP to be transmitted to the discriminator TI.

One example of the detailed controlling circuit CC is constituted as shown in FIG. 2.

In the FIG. 2, the output of the divider circuit DIV is supplied to a first OFF time delay device $TDD_1$ to delay for a predetermined time. The output of the first OFF time delay device TDD is supplied to a second OFF delay device $TDD_2$ to delay for a predetermined time.

A first pulse generator $PG_1$, connected with the output of the first time delay device $TDD_1$, produces a judging pulse JP to be transmitted to the discriminator TI when the output of the first time delay device falls.

A second pulse generator $PG_2$, connected with the output of the second time delay device $TDD_2$, produces a clear pulse CP to be transmitted to the pulse counter C when the output of the second time delay device falls.

The waveforms of each portion of the digital type frequency relay shown in FIG. 1 are shown in Figure 3. The operation of the conventional digital type relay is explained in reference to FIG. 3.

The output of the divider circuit DIV is a waveform with a 50% duty cycle (mark/space ratio=1) and a period corresponding to the number of the periods of m cycles from the line voltage (potential transformer output), where m=1 as shown.

The pulse counter C counts the number of the reference clock signal generated by the oscillator OSC, while the output of the divider circuit is at the logic "1".

The counted value is compared with the setting value from the setter SET at the comparator COM.

In this relay, for example, an under frequency relay, the discriminator TI is set at a logic "1" on receiving the judging pulse JP when the counted value is larger than the setting value. Moreover, in order to continuously repeat measuring the period, the pulse counter C is initialized or cleared by a clear pulse CP generated from the controlling circuit after generation of the judging pulse JP.

As described above, in the conventional digital type frequency relay the judging pulse JP periodically generates one pulse every two m cycles (m=1, 2, 3, ...) and the judging of the operation is carried out.

However, this is a principal factor in producing the operating time error in the frequency relay, as explained hereinafter. For convenience's sake of the explanation, the under-frequency relay is explained below.

Referring to FIG. 3, again, the output of the discriminator TI represents the "operate" logic level at time $t_4$, but in order to judge the operation of the relay at time $t_4$, the frequency must change to less than the set frequency threshold before time $t_3$, because the judging operation is carried out based on the counting result of pulse counter C which counts during one cycle commencing from time $t_3$.

On the other hand, in case the frequency is less than the set frequency threshold before time $t_1$, the output of the discriminator TI represents the "operate" level at time $t_2$ based on the counting result of the pulse counter C which counts during one cycle commencing from time $t_1$.

Accordingly, the output of the discriminator TI represents the "operate" output level so that the frequency must change less the set frequency threshold at a time t ($t_1 < t < t_3$).

Turning now to another consideration, in the time when the discriminator TI outputs the "operate" logic level after the frequency changes less than the set frequency threshold, i.e. the operating conditions are met, the operating time during the period ($t_3 - t_1$), i.e. substantially two m cycles, is not consistent in the principle.

Typically, the number of periods m to be measured is minimized in order to reduce the delay till operating time.

However, even if the number m is set to a numeral one, the delay of the operating time of substantially two cycles exists in principle.

Especially, in case that the system detects the changing rate of the frequency using two frequency relays and executes the protection of the power line, it is impossible to ignore the delay of operating time of two frequency relays.

It is, for instance, assumed that if the frequency of the power line falls to a value 0.5 Hz less than a rated frequency, this is to be detected.

Such a system is shown in FIG. 4. A first under-frequency relay $UF_1$ is set to operating frequency $F_1Hz$ is connected to one input terminal of an inhibit circuit INHIBIT through a time delay circuit TDE having a delay time of 0.2 seconds. A second under-frequency relay $UF_2$ set to operating frequency $f_2$ $(f_1-0.5)Hz$ is connected to another input terminal of the inhibit circuit INHIBIT.

The inhibit circuit INHIBIT serves to block the output thereof when the output of the time delay circuit TDE is at an "operating" logic level.

The operation of the system shown in FIG. 4 is explained. In the event that after the first under frequency relay $UF_1$ generates an "operating" logic level output, the second under frequency relay $UF_2$ does likewise within 0.2 seconds, the output to be protected from inhibit circuit INHIBIT is generated because the second under frequency relay $UF_2$ outputs before the inhibit conditions of the inhibit circuit are met.

It is therefore assumed that in this system the time to be detected is $\Delta T$ seconds and the falling frequency deviation is $\Delta F$ Hz, the output to be protected is generated under the following condition:

$$\frac{\Delta F}{\Delta T} > \frac{0.5 \text{ Hz}}{0.2 \text{ sec}} = 2.5 \text{ Hz/sec}$$

Since the delay of substantially two cycles operating time in principle in the conventional frequency relay, as described above, exists, the influence of the delay is explained as follows:

If it is assumed the operating time of the relay is 100 milli-seconds, it should be understood that the scope of the delay of operating time is 40 milli-seconds (2 cycle×20 milli-seconds (1/50 Hz)) and a relatively maximum operating time difference, 80 milli-seconds (2×40 milli-seconds) between two relays exists. This means the error of the operating time of the system shown in FIG. 4 is as follows:

$$\frac{\Delta F}{\Delta T} = \frac{0.5 \text{ Hz}}{0.2 \text{ Sec.} \pm 40 \text{ MSEC}} = 2.08 \sim 3.13 \text{ Hz/sec}$$

Therefore, the system shown in FIG. 4 can be always operated if the changing rate of the frequency is larger than 3.13 Hz/sec, but the system can be not always operated when the changing rate varies in the range from 2.08 Hz/sec to 3.13 Hz/sec.

The system shown in FIG. 4 is intended always to be able to operate when the changing rate of the frequency is larger than 2.5 Hz/sec and always not to be able to operate when the changing rate is equal to and less than 2.5 Hz/sec.

However, as described above, an indefinite condition of the detecting sensitivity presents a limitation for executing the protection of the power line.

SUMMARY OF THE INVENTION

Accordingly, it is one object of this invention to provide a new and improved frequency relay for use in the protection of an electric power transmission line in which the problems as described above are eliminated.

Another object of this invention is top provide a new and improved frequency relay for use in the protection of an electric power transmission line in which the operating time of the frequency relay can be minimized in order to detect rapidly the changing rate of the frequency.

Briefly, in accordance with one aspect of this invention, a frequency relay is provided including oscillating means for generating a reference frequency signal, input means for receiving AC electric signals, first counting means connected to the oscillating means and the input means for counting the number of cycles of the reference signal only during each positive half cycle of the AC electric signals, second counting means connected to the oscillating means and the input means for counting the number of cycles of the reference signal only during each negative half cycle of the AC electric signals, first and second updating means connected to first and second counting means for updating the number counted by the first and second counting means, respectively, and means for comparing the output of the first and second updating means with a predetermined setting value.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 5:
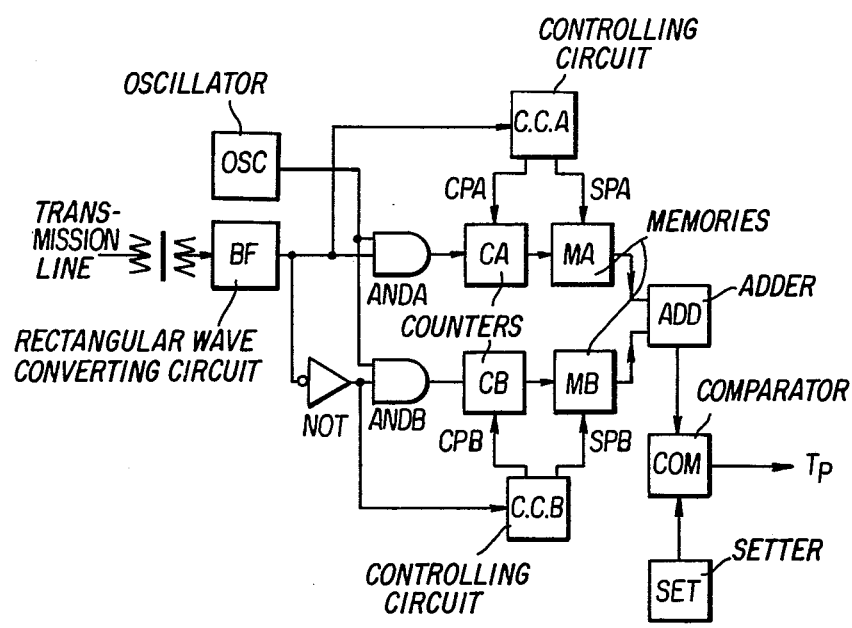
FIG. 5 is a circuit diagram of one embodiment of a digital type frequency relay according to this invention.

Referring now to the drawings, wherein like reference numerals and letters designate identical or corresponding parts throughout the several views, and more particularly to FIG. 5 thereof, one preferred embodiment of a frequency relay in accordance with this invention is there shown as including a rectangular waveform converter circuit. The rectangular waveform converter includes an auxiliary transformer PT to convert the voltage from the transmission line to a voltage signal having a suitable voltage level and a rectangular waveform converter BF to convert the converted voltage signal to a rectangular waveform signal.

OSC represents an oscillator which generates a reference frequency $f_{OSC}$ to be used to measure the period of the voltage from the transmission line.

The outputs from the rectangular waveform converter circuit and from the oscillator OSC are supplied to a first counter circuit which includes an AND logic circuit ANDA having two input terminals and a first counter CA to be connected in series with the AND logic circuit ANDA.

The output of the rectangular waveform converter circuit is supplied to a second counter circuit which includes an inverting circuit NOT, an AND logic circuit ANDB and a second counter CB. The one input terminal of the AND logic circuit ANDB is connected to the output terminal of the oscillator OSC, and the other input terminal of the AND logic circuit ANDB is connected to the ouput terminal of the rectangular waveform converter circuit via the inverting circuit NOT.

The outputs from the counters CA and CB are supplied to respective memory circuits MA and MB, which permits updating of the values in the memory circuits, respectively. The first counter CA, first memory circuit MA and the second counter CB, second memory circuit MB are controlled by a first controlling circuit CCA and a second controlling circuit CCB, respectively, in respnse to the rectangular waveform signal and inverted rectangular waveform signal.

Figure 2:
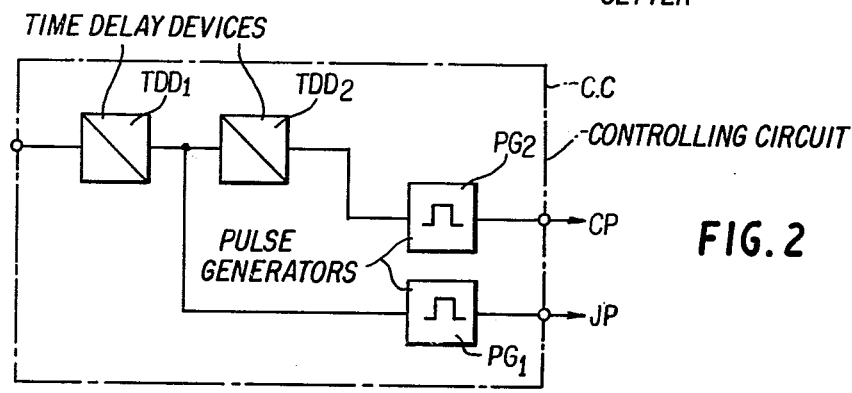
FIG. 2 is a circuit diagram of one example of a controlling circuit shown in FIG. 1.
Figure 3:
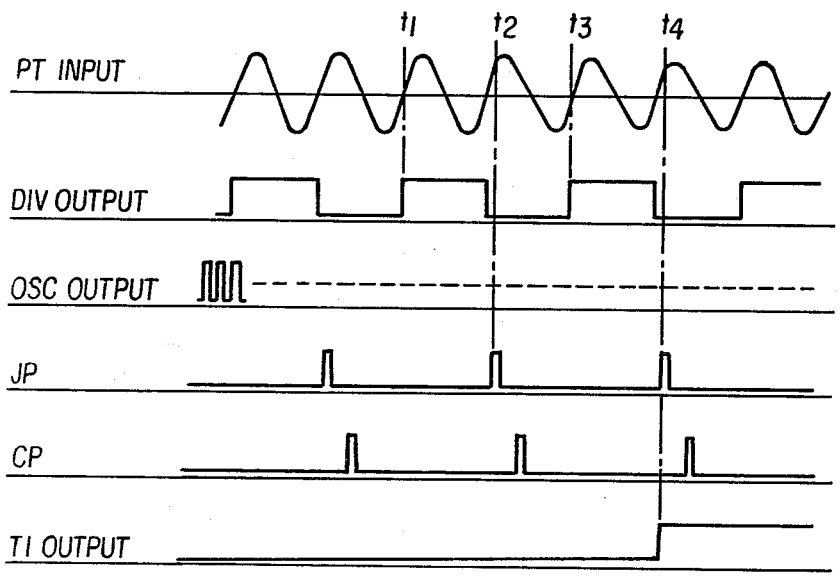
FIG. 3 is a time chart for explaining the operation of the conventional frequency relay shown in FIG. 1.

As the structure and function of the first controlling circuit CCA is the same as that of the second controlling circuit CCB, that of the first controlling circuit CCA is explained in reference with FIG. 2.

The output from the rectangular waveform converter circuit is supplied to a first pulse generator PG1 through a time delay device having delayed time "t". When the memory pulse SP (JP terminal in FIG. 2) from the pulse generator PG1 is supplied to the controlling terminal of the memory circuit M, the content stored in the memory circuit M is cleared and then the content from the counter C is newly stored in the memory circuit M.

On the other hand, the output from the time delay device TDD1 is supplied to a second pulse generator PG2 via a second time delay device TDD2 having a predetermined delayed time. When the output CP (CP terminal in FIG. 2) from the pulse generator PG2 is supplied to a clear terminal of the counter C, the counter C is cleared, then initialized to count the pulse from the AND logic circuit.

Thus, the first controlling circuit CCA generates a clear pulse CPA for the counter CA and a memory pulse SPA for the memory circuit MA. The second controlling circuit CCB generates a clear pulse CPB for the counter CB and a memory pulse SPB for the memory circuit MB.

The outputs from the first and second memory circuits MA and MB are added in an adder ADD and then the added output is supplied to a comparator COM which generates a trip signal $T_p$ in response to the result of comparison with a set value from a setter SET.

Figure 6:
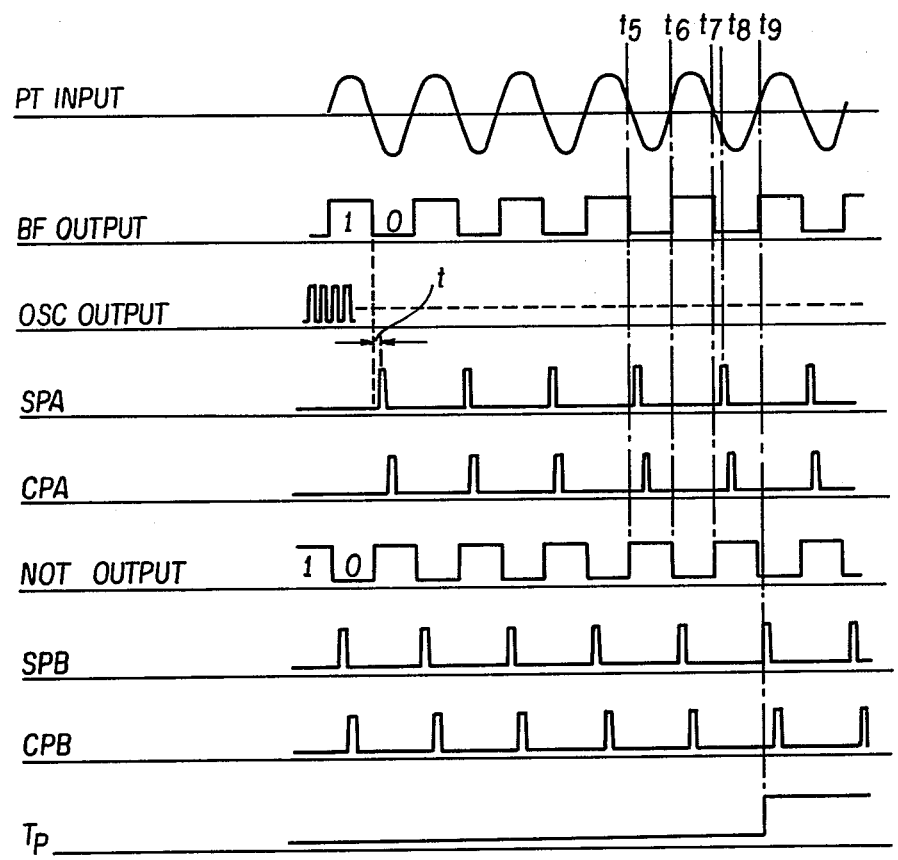
FIG. 6 is a time chart for explaining the operation of the frequency relay shown in FIG. 5.

The operation of this embodiment shown in FIG. 5 is explained in reference with FIG. 6. The output of the rectangular waveform converter BF is a waveform having a 50% duty cycle (mark/space ratio=1), and a period equal to that of the voltage signal from the auxiliary transformer PT.

The counter CA counts the reference clock pulses generated from the oscillator OSC, while the output from the waveform converter BF is a logic "1". The value counted in the counter CA is stored into the memory circuit MA by the memory pulse SPA generated from the first controlling circuit CCA at a time after the predetermined time t from when the logic output "1" from the waveform converter BF is changed to a logic "0".

In order to continuously count the next positive half cycle period from rectangular waveform converter BF, the counter CA is then initiated by the clear pulse CPA generated by the controlling circuit CCA successive to generation of the memory pulse SPA.

On the other hand, the second counter CB is responsive to the negative half cycle period of the output from the rectangular waveform converter BF through the inverting circuit NOT. Therefore, the counter CB counts the reference clock pulse generated from the oscillator OSC while the output from the inverting circuit NOT is a logic "1".

The value counted in the counter CB is stored into the memory circuit MB by the memory pulse SPB generated from the second controlling circuit CCB at a time after the predetermined time t from when the logic output "1" from the inverting circuit NOT is changed to the logic "0".

In order to continuously count the next positive half-cycle period from the inverting circuit NOT, the counter CB is then initiated by the clear pulse CPB generated by the controlling circuit CCB successive to the generation of the memory pulse SPB.

Thus, as described above, the outputs from the memory circuits MA and MB are supplied to the comparator COM via the adder ADD to compare the added value with the set value from the setter SET. For instance, when the added value exceeds the set value, the comparator COM generates a trip signal TP as an output of a frequency relay.

In this embodiment as described above, the counted value stored in the first memory MA in proportion to the time for the positive half-cycle of the voltage signal from the auxiliary transformer PT and the counted value stored in the second memory MB in proportion to the time for negative half-cycle of the voltage signal from the auxiliary transformer PT are added by the adder ADD to have a resultant counted value corresponding to one cycle of the voltage signal from the auxiliary transformer PT.

The added value is then compared with the set value from the setter SET.

Since the contents of one of the memory circuits MA and MB are updated once at each half cycle, the judging operation of the frequency relay is carried out once at each half-cycle. Accordingly, the delaying of the operating time of frequency relay is improved below a half-cycle of the voltage signal from the auxiliary transformer PT.

In FIG. 6, the trip signal TP from the comparator COM positions the "operate" logic level (logic "1"). The judging operation is based on the adding, the counting result of the counter CA during the positive half-cycle successive to the time $t_6$ to the counting result of the counter CB during the negative half-cycle successive to the time $t_7$. In order to execute such a judging operation, the transmission line frequency must be below the operating frequency before the time $t_6$.

On the other hand, in a case where the line frequency changes below the operating frequency before the time $t_5$, based on the result obtained by addition of the counting result of the counter CA carried out during the negative half-cycle successive to the time $t_5$ and the counting result of the counter CB carried out during the positive half-cycle successive of the time $t_6$, the judging operation is executed. Therefore, the trip signal from the comparator COM should generate at time $t_8$.

Accordingly, in order to produce the trip signal $T_p$ from the comparator COM at time $t_9$, the line frequency must be changed below the operating frequency of the frequency relay during the time t ($t_5 < t < t_6$).

It should be understood that the delaying time of one-half cycle, i.e. ($t_6 - t_5$), exists as the operating time from after the line frequency becomes below the operating frequency, that is, the operating condition of relay is met till the trip signal $T_p$ is outputted from the comparator COM.

Figure 1:
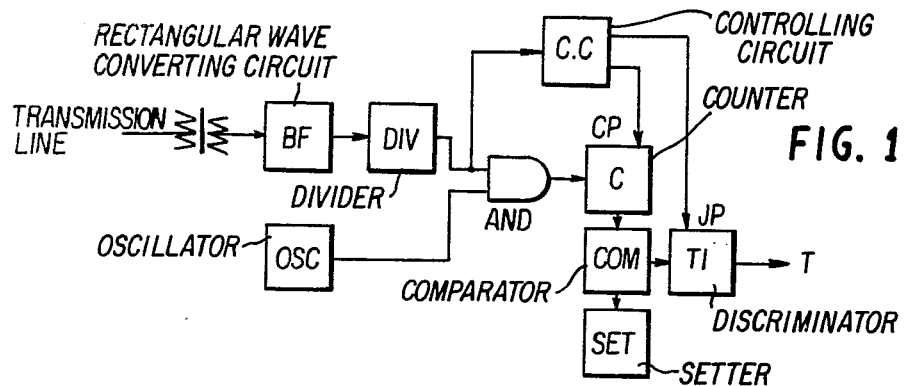
FIG. 1 is a circuit diagram of one example of a conventional frequency relay.

It should be also understood that the delaying time of the relay is improved to one-fourth that of the conventional frequency relay as shown in FIG. 1.

Figure 4:
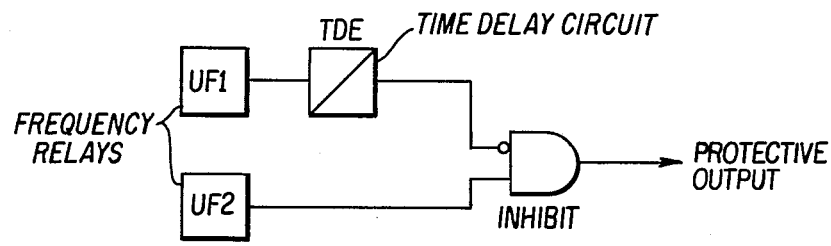
FIG. 4 is a circuit diagram of one example of a frequency relay system which detects a changing rate of the frequency.

The operation in case that the relay of one embodiment according to this invention as shown in FIG. 5 is applied to the system shown in FIG. 4 is explained. It is assumed that the output of relay is generated after the output $T_p$ from the comparator COM is delayed for the predetermined time and the operating time of the relay is, for instance, 100 milli-seconds.

The delayed time of the operating time becomes ½ cycle×20 milli-seconds (1/50 Hz)=10 milli-seconds (50 Hz reference). As a result, the maximum operating time difference of 2×10 milli-seconds relatively exists between two relays.

The delayed time $\Delta F/\Delta T$ of this system is as follows:

$$\frac{\Delta F}{\Delta T} = \frac{0.5 \text{ Hz}}{0.2 \text{ sec.} \pm 10 \text{ milli-sec}} = 2.38 \text{ Hz/sec} \sim 2.63 \text{ Hz/sec}$$

Accordingly, it is possible to improve significantly the detecting error compared with that achieved by the conventional relay.

Furthermore, since the delay time until the time the relay is operated is less than a half-cycle of line voltage, it is possible to rapidly operate the relay.

Obviously, many modifications and variations of the present invention are possible in light of the teachings of the present invention. Thus, although the invention has been explained by way of example shown in FIG. 5, it should be apparent that this invention is not limited to the one example shown in FIG. 5 and if desired the rectangular waveform converter BF shown in FIG. 5 could be substituted to a level detecting circuit LD which detects a predetermined level of the transmission line voltage.

In this case, the operation is the same as that described above, except that the mark/space ratio of the output waveform from the level detecting circuit is different from the ratio "1".

Although the output from the comparator COM has been explained as a direct output of the relay, this invention is not so limited, and if desired a time delaying device, or a sequence circuit or a combination of these circuits could be provided with the comparator as a successive stage.

Furthermore, although each circuit in FIG. 5 has been explained as an independent element, this invention is not limited thereto and if desired the counters CA and CB could be substituted for by parts of a register in a logic circuit of the type controlled by a stored program and the memory circuits MA and MB could be substituted for by a part of a random access memory circuit.

According to this invention as described above, it is possible to reduce the delaying time, i.e. operating time error of the delay wich conventionally exists in principle by providing a simple construction.

In case this invention is applied to the system which detects the frequency changed rate, it is possible to provide a frequency relay which significantly improves the protective frequency performance.

It is therefore to be understood that within the scope of the appended claims, the invention may be practiced otherwise than as specifically described herein.

What is claimed as new and desired to be secured by Letters Patent of the United States is:

1. a frequency relay comprising:
   oscillating means for generating a reference frequency signal;
   input means for receiving AC electric signals;
   first counting means connected to the oscillating means and the input means for counting the number of pulses at the output of the oscillating means only during the positive half cycle of the AC electrical signals;
   second counting means connected to the oscillating means and the input means for counting the number of pulses at the output of the oscillating means only during the negative half-cycle of the AC electric signals;
   first and second updating means having respective outputs and respectively connected to the first and second counting means for updating the numbers counted by the respective counting means;
   means for combining the outputs of said first and second updating means;
   comparing means for comparing the combined output of the first and second updating means with a predetermined setting value at each half-cycle of the electric signals;
   means for clearing the first and second updating means in response to the AC electric signal from the input means; and
   means for clearing the first and second counting means in response to the AC electric signal from the input means.

2. A frequency relay as recited in claim 1, further comprising:
   summing means for summing the outputs of the first and second updating means, wherein the sum output of the summing means is transmitted to the comparing means.

3. A frequency relay as recited in claim 1, wherein the first counting means comprises:
   a logic AND circuit connected to the oscillating means and the input means, and
   a counter connected to the output of the logic AND circuit, wherein the counter is cleared in response to the AC electric signals from the input means.

4. The frequency relay as recited in claim 1, wherein the second counting means comprises:
   an inverting circuit connected to the input means,
   a logic AND circuit connected to the oscillating means and the output of the inverting circuit, and
   a counter connected to the output of the logic AND circuit, wherein the counter is cleared in response to the AC electric signals from the input means.

5. A frequency relay as recited in claim 1, wherein the input means comprises:
- a potential transformer connected to an AC power line, and
- a wave forming circuit for converting the AC electric signal to a rectangular waveform.

6. A frequency relay as recited in claim 1, further comprising:
- first and second controlling circuits for controlling the first and second counting means and the first and second updating means, so as to be cleared in response to the AC electric signals, respectively,

7. A relay circuit for detecting the changing rate of frequency, comprising:
- two frequency relays, each as recited in claim 1, having different predetermined setting values;
- a delaying circuit connected to one of the frequency relays; and
- a logic circuit coupled to the delaying circuit and the other of the frequency relays.

* * * * *